US006938374B2

United States Patent
Yamamoto et al.

(10) Patent No.: US 6,938,374 B2
(45) Date of Patent: Sep. 6, 2005

(54) GUIDE SYSTEM FOR GUIDING WINDOW GLASS OF VEHICLE

(75) Inventors: Yasuo Yamamoto, Utsunomiya (JP); Takenori Nishimura, Tokyo (JP); Nobuji Suzuki, Tokyo (JP)

(73) Assignees: Nifco Inc., Yokohama (JP); Fuji Jukogyo Kabushiki Kaisha, Tokyo (JP)

( * ) Notice: Subject to any disclaimer, the term of this patent is extended or adjusted under 35 U.S.C. 154(b) by 36 days.

(21) Appl. No.: 10/662,349

(22) Filed: Sep. 16, 2003

(65) Prior Publication Data

US 2004/0083654 A1 May 6, 2004

(30) Foreign Application Priority Data

Nov. 1, 2002 (JP) ........................................ 2002-319816

(51) Int. Cl.⁷ ................................................ E05F 11/38
(52) U.S. Cl. .......................................... 49/348; 49/374
(58) Field of Search .......................... 49/348, 349, 350, 49/351, 374, 375; 16/93 R, 95 R

(56) References Cited

U.S. PATENT DOCUMENTS

| | | | |
|---|---|---|---|
| 3,466,802 A | * | 9/1969 | Doveinis et al. ............... 49/428 |
| 4,782,629 A | | 11/1988 | Mori et al. |
| 4,829,630 A | * | 5/1989 | Church et al. ............... 16/93 R |
| 6,055,778 A | * | 5/2000 | Ide et al. ...................... 49/375 |
| 6,295,762 B1 | * | 10/2001 | Nemoto ........................ 49/374 |
| 6,763,550 B2 | * | 7/2004 | Regnier ........................ 16/193 |

OTHER PUBLICATIONS

Patent Abstracts of Japan, Publication No. 06137023, Publication Date May 17, 1994, Applicant Shiroki Corp.
Patent Abstracts of Japan, Publication No. 07217310, Publication Date Aug. 15, 1995, Applicant Nifco Inc.
Patent Abstracts of Japan, Publication No. 10227176, Publication Date Aug. 25, 1998, Applicant Aoyama Seisakusho Co., Ltd.
Patent Abstracts of Japan, Publication No. 09242416, Publication Date Sep. 16, 1997, Applicant Oi Seisakusho Co., Ltd.
Patent Abstracts of Japan, Publication No. 2000017946, Publication Date Jan. 18, 2000, Applicant Ansei KK.

* cited by examiner

*Primary Examiner*—Jerry Redman
(74) *Attorney, Agent, or Firm*—Manabu Kanesaka

(57) ABSTRACT

A guide system for guiding a window glass of a vehicle includes a guide rail and a guide. The guide includes a shaft to be attached to the window glass; a base as one part of a component divided in a widthwise direction of the vehicle and contacting an inner surface of the guide rail at an inner side of the vehicle; and a slider slidably attached to the base as the other part of the component and contacting an inner surface of the guide rail at an outer side of the vehicle. An elastic member is disposed between the base and the slider for pressing the slider toward the outside of the vehicle.

11 Claims, 9 Drawing Sheets

GUIDE SYSTEM FOR GUIDING WINDOW GLASS OF VEHICLE

BACKGROUND OF THE INVENTION AND RELATED ART STATEMENT

The present invention relates to a guide system for guiding a window glass of a vehicle, particularly to the guide system for effectively eliminating a play between the glass and a guide rail.

A conventional guide includes a main member of a guide rail sliding in a groove with a roughly C-shaped cross section, and a shaft rotatably supported on the main guide member and projected from an open portion of a guide rail for holding a window glass (for example, refer to the following references No. 1 to No. 5).

Also, as a conventional attachment structure of the guide rail, a pair of the guide rails is disposed in front and rear sides of a door. In the guide rails, the front guide rail has an opening facing a glass surface, and the rear guide rail has an opening facing the front of the vehicle (for example, refer to the following reference No. 6).

Reference No. 1
Japanese Utility Model Publication (Jikkai) No. 01-170775 (FIG. 1)
Reference No. 2
Japanese Patent Publication (Tokkohei) No. 04-60190 (FIG. 1)
Reference No. 3
Japanese Utility Model Publication (Jikkai) No. 04-124510 (FIG. 2)
Reference No. 4
Japanese Patent Publication (Kokai) No. 05-280246 (FIG. 1)
Reference No. 5
Japanese Patent Publication (Kokai) No. 07-52645 (FIGS. 1 and 2)
Reference No. 6
Japanese Patent Publication (Kokai) No. 2001-270329 (FIG. 1 and 2)

However, the above-mentioned conventional guides are mounted on the guide rails with the openings facing the glass surface. When the guide is mounted on the guide rail with the opening facing the front of the vehicle, there is a problem in which it is easy to rattle or make noises by a play therebetween.

In other words, in the conventional guide, the rattles inside the guide rail are absorbed by elasticity against a force in an axial direction of the shaft. On the other hand, if the opening faces the front of the vehicle, the direction of the force exerted on the shaft changes in a 90 degrees different direction. Therefore, when the conventional guide is mounted on the guide rail with the opening facing the front of the vehicle, the force is exerted in a direction perpendicular to the shaft, thereby causing a risk wherein the guide moves with the rattle in a width direction of the guide rail.

Accordingly, in view of the above-mentioned problem associated with the conventional technology, the present invention has been made, and an object of the present invention is as follows. An object of the first aspect of the invention is to provide a guide suitable for a guide rail with an opening facing at least one of the front and backside of the vehicle.

That is, the guide is divided in the width direction of the vehicle and a shaft is directly connected to a base side. Therefore, when a force is exerted on the base side, it is possible to prevent the rattles. On the other hand, when the force is exerted on a slider side through the shaft, the rattles can be absorbed by an elastic member disposed between the base and the slider. According to the second aspect, in addition to the object of the first aspect of the invention described above, an object is as follows.

The object of the second aspect of the present invention is to provide a guide in which projections of the guide elastically abut against a bottom of the guide rail, thereby absorbing the rattles in a vertical direction of the guide rail. According to the third aspect, in addition to the object of the second aspect of the invention described above, an object is as follows.

The object of the third aspect of the invention is to provide a guide having an elastic member for supporting an elastic force of the projections. According to the fourth aspect, in addition to any one of the objects of the first to third aspects of the invention described above, an object is as follows.

The object of the fourth aspect of the invention is to provide a guide wherein a notch engages a claw, thereby simplifying an assembly of the guide, and also it is possible to control a sliding amount of a slider relative to the base. According to the fifth aspect, in addition to any one of the objects of the first to fourth aspects of the invention described above, an object is as follows.

The object of the fifth aspect of the invention is to provide a guide suitable for a guide rail with an opening facing the front of the vehicle. According to the sixth aspect, in addition to any one of the objects of the first to fifth aspects of the invention described above, an object is as follows.

The object of the sixth aspect of the invention is to provide a guide wherein a shaft is rotated in upper and lower directions of the window glass to smoothly raise and lower the window glass. For example, even when the guide rail is slightly curved relative to a moving direction of the vehicle, the shaft is rotated in the upper and lower directions of the window glass, thereby absorbing the curve of the guide rail.

Incidentally, the rotation of the shaft in the width direction of the vehicle is limited so as not to hinder the function of the guide for preventing and absorbing the rattles of the window glass.

Further objects and advantages of the invention will be apparent from the following description of the invention.

SUMMARY OF INVENTION

The present invention has been made in order to achieve the above-mentioned objects, and characteristics of the invention will be explained.

According to the first aspect of the invention, a guide rail (for example, a backside guide rail) includes the following structure.

(1) Inner back wall
(2) A pair of sidewalls extending from the inner back wall
(3) Open portion facing the inner back wall.

The open portion of the guide rail may face at least one of front and rear directions of a vehicle (for example, a backside guide rail). The guide for raising and lowering a window glass of the vehicle is mounted to be slidable inside the guide rail (for example, the backside guide rail), and includes the following structure.

(4) Shaft

The shaft is fixed to the window glass projecting from the open portion. More specifically, the shaft is fixed to the window glass through a bracket.

The shaft may be directly fixed to the window glass without the bracket. The guide includes the following structure.

(5) Base

The base is one part of a component divided in the width direction of the vehicle, and contacts an inner surface of a sidewall of the pair of the sidewalls at an inside of the vehicle (for example, an inner vehicle sidewall).

(6) Slider

The slider is the other part of the component divided in the width direction of the vehicle, and contacts an inner surface of the sidewall of the pair of the sidewalls at an outside of the vehicle (for example, an outer vehicle sidewall). Also, the slider is held by the base and can slide in the width direction of the vehicle.

(7) Elastic member (for example, the first elastic member)

The elastic member (for example, the first elastic member) is located between the base and the slider, and presses the slider toward the outside of the vehicle. According to the second aspect of the invention, in addition to the characteristics of the first aspect of the invention, the characteristics are as follows.

At least one of the base and the slider has a projection elastically projecting toward the inner surface of the inner back wall of the guide rail (for example, the backside guide rail). According to the third aspect of the invention, in addition to the characteristics of the second aspect of the invention, a characteristic is as follows.

The projection is urged in a direction that the projection projects toward the inner surface of the inner back wall of the guide rail (for example, the backside guide rail) with the elastic member (for example, the first elastic member). According to the fourth aspect of the invention, in addition to any one of the characteristics of the first to third aspects of the invention, the characteristics are as follows.

First, one of the base and the slider includes a depression. Second, the other of the base and the slider includes a claw for connecting the base to the slider when the claw elastically fits into the depression.

Third, the depression is provided with a stopper at one end thereof for controlling the slider to move toward the outside of the vehicle by abutting against the claw. According to the fifth aspect of the invention, in addition to any one of the characteristics of the first to fourth aspects of the invention, the characteristics are as follows.

That is, the guide rail (for example, the backside guide rail) has the open portion facing the front of the vehicle. According to the sixth aspect of the invention, in addition to any one of the characteristics of the first to fifth aspects of the invention, the characteristics are as follows.

That is, the shaft is held by the base and mounted to be rotatable only in the upper and lower directions of the window glass.

DETAILED DESCRIPTION OF PREFERRED EMBODIMENTS

Figure 1:
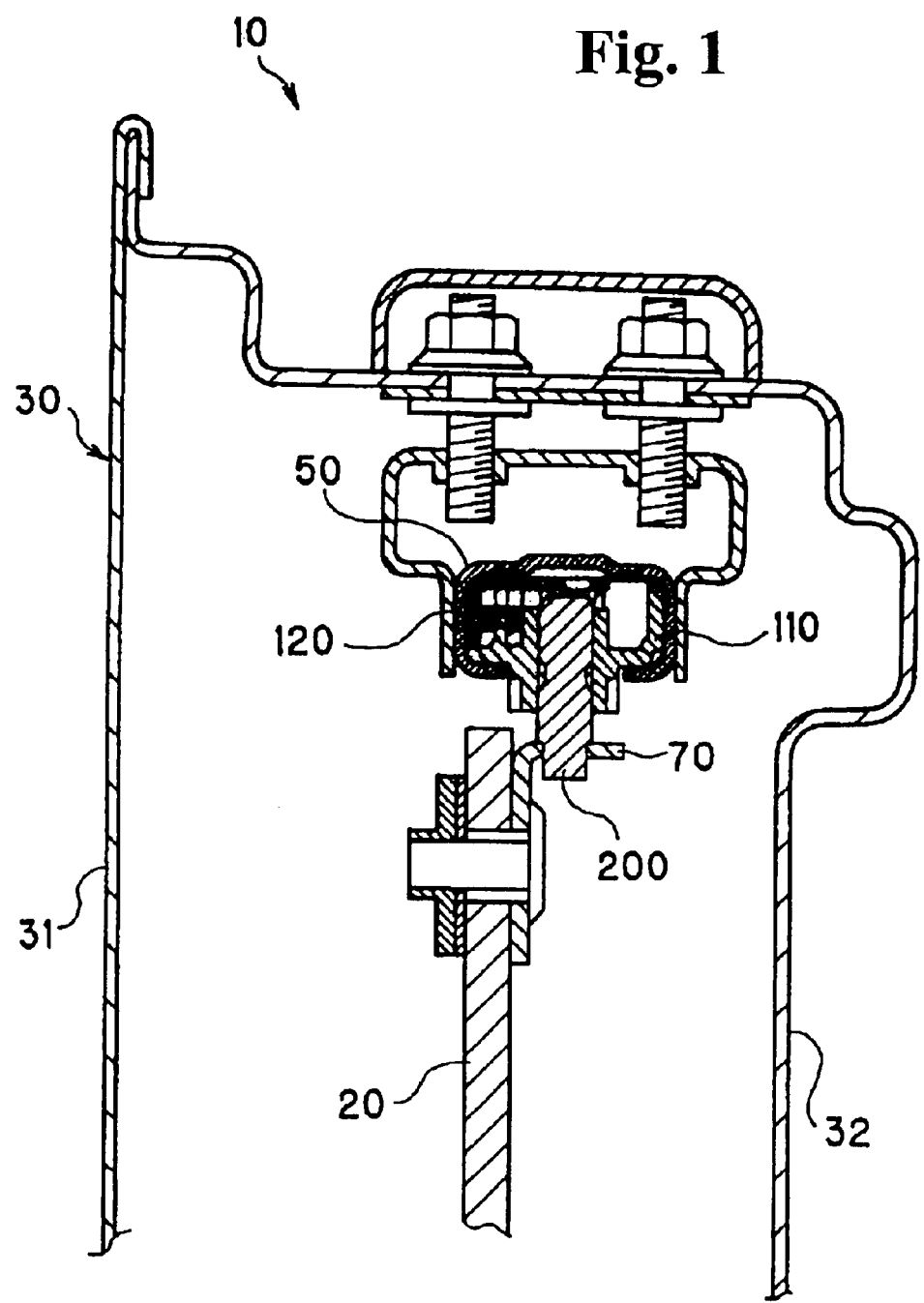
FIG. 1 is a partial cross sectional view showing a device for elevating and lowering a window glass of a vehicle.
Figure 2:
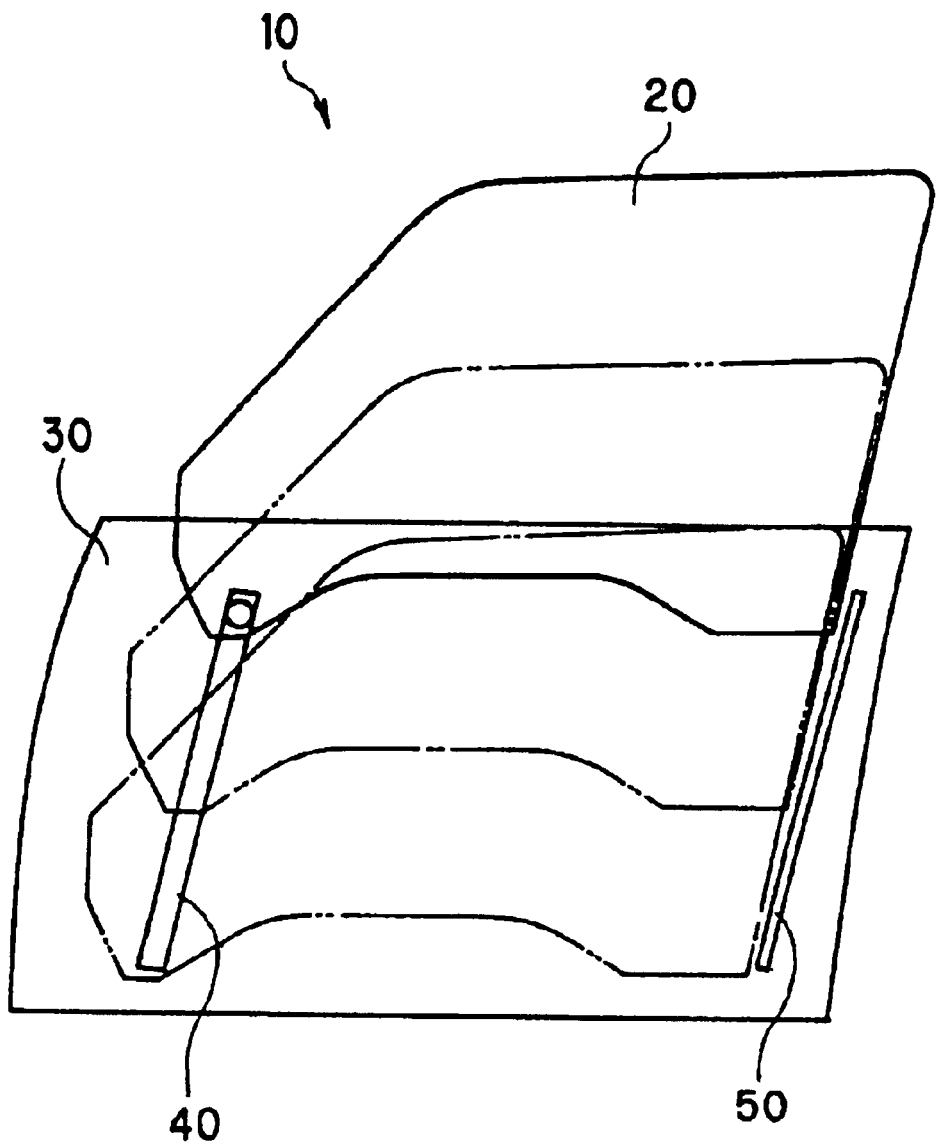
FIG. 2 is a side view of a door.
Figure 3:
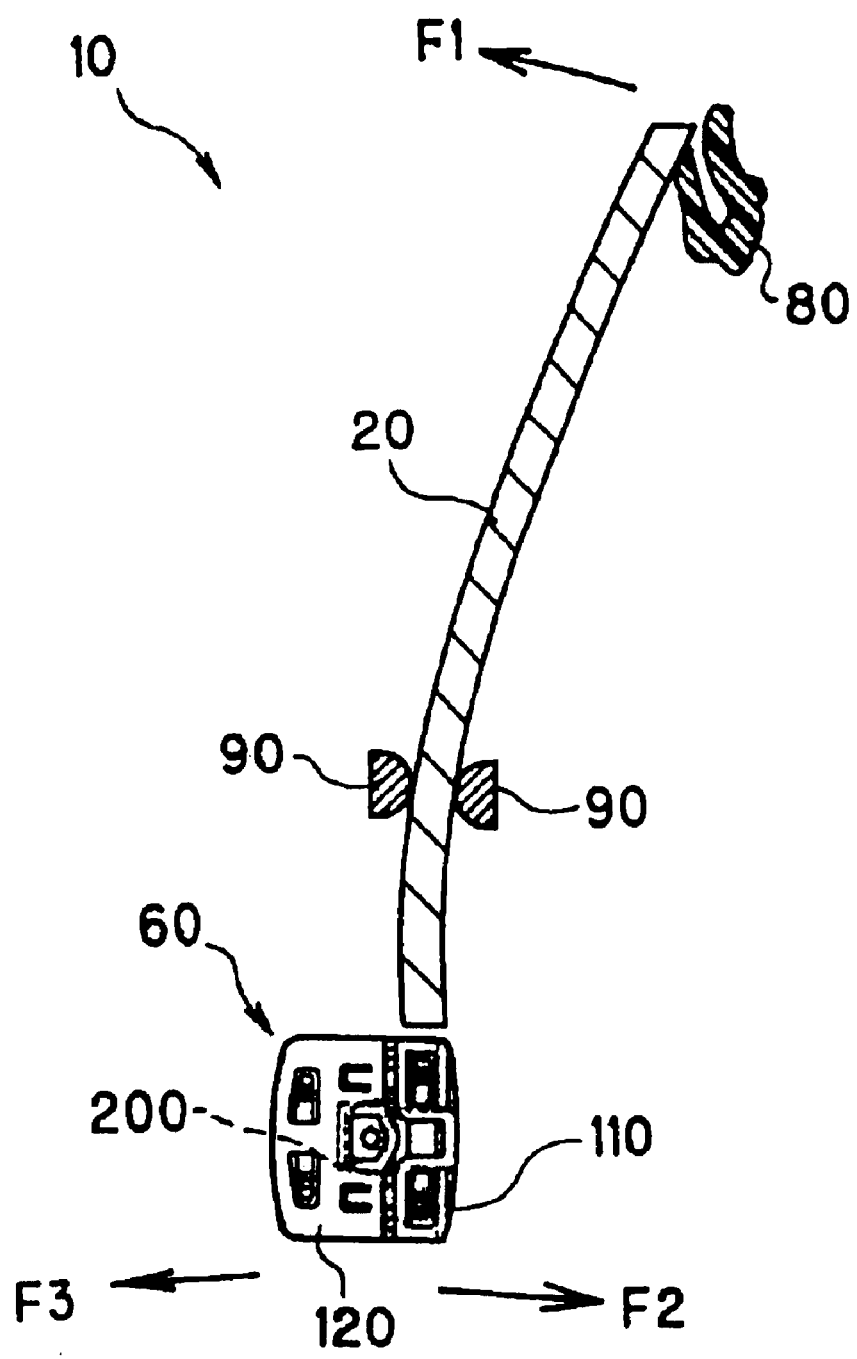
FIG. 3 is a partial cross sectional view showing a mounting state of the window glass.
Figure 4:
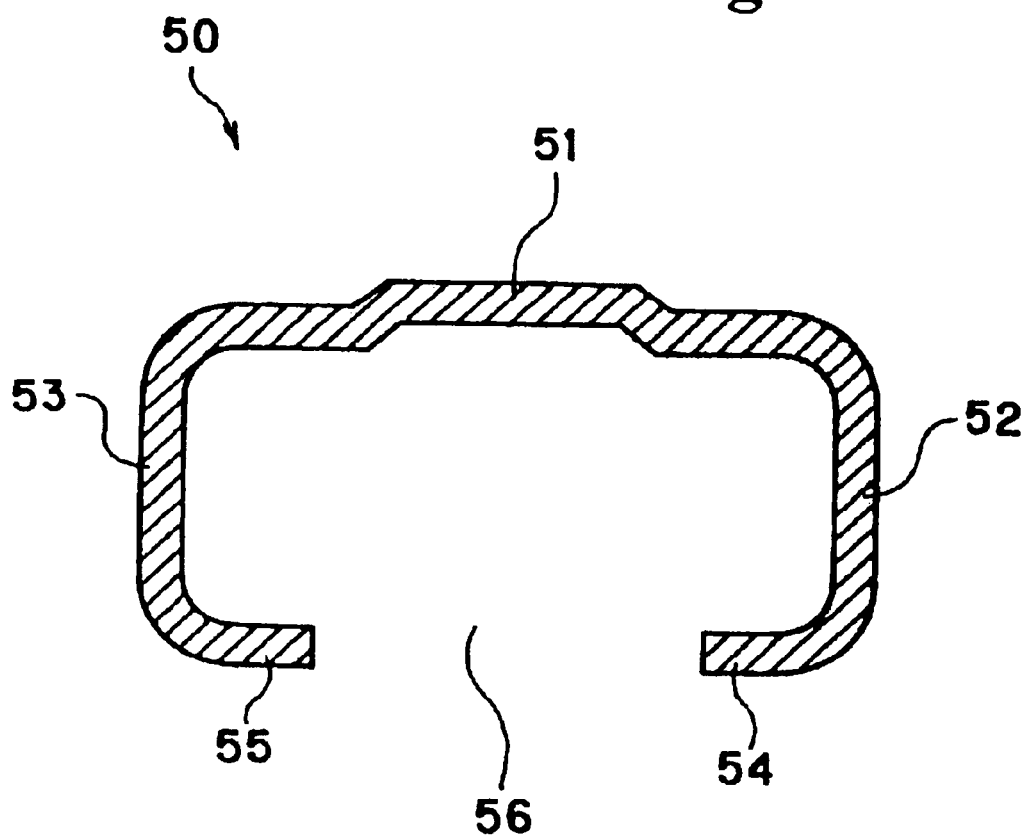
FIG. 4 is an enlarged cross sectional view of a backside guide rail shown in FIG. 1.
Figure 5:
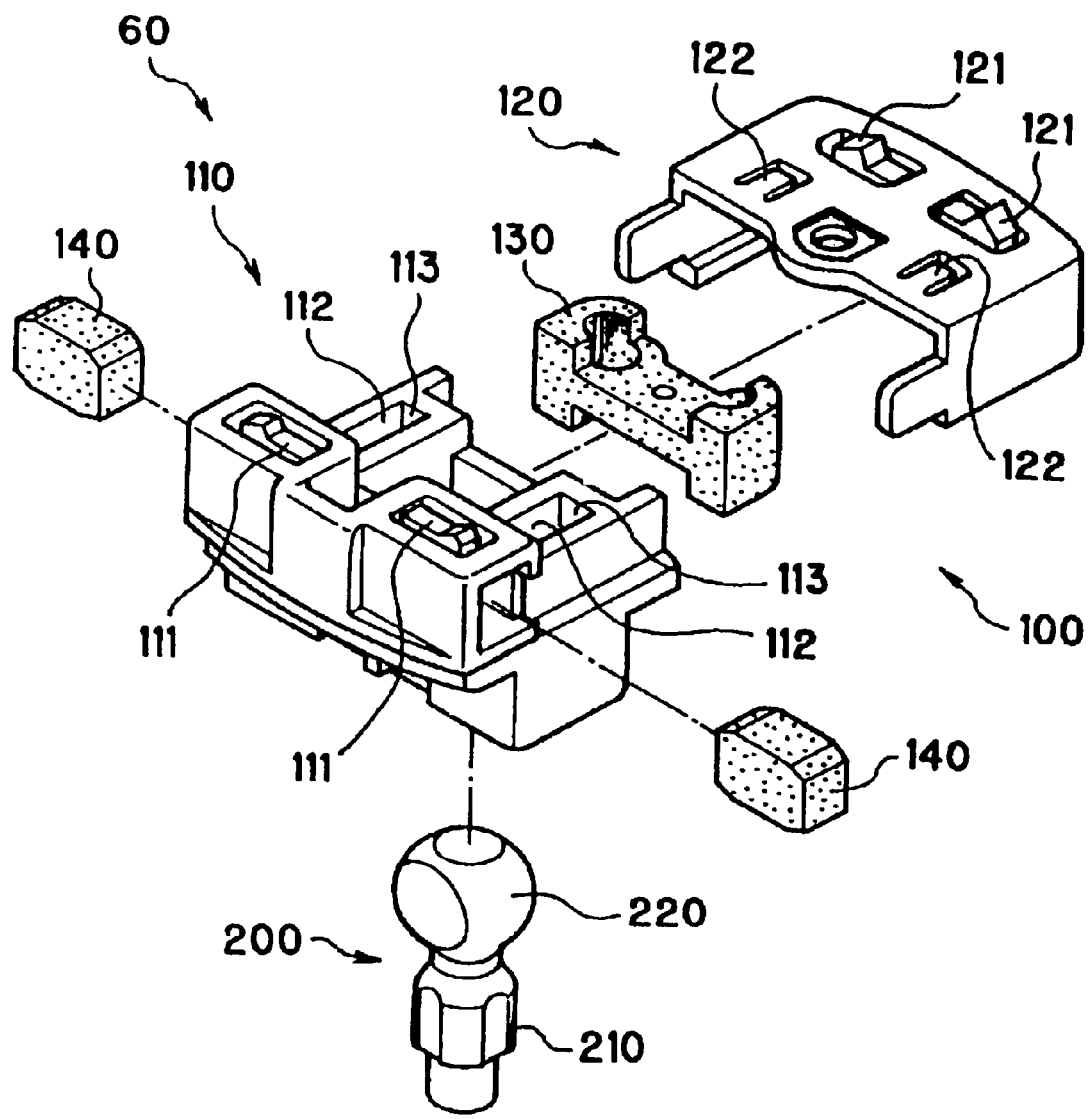
FIG. 5 is an exploded perspective view of a guide.
Figure 6:
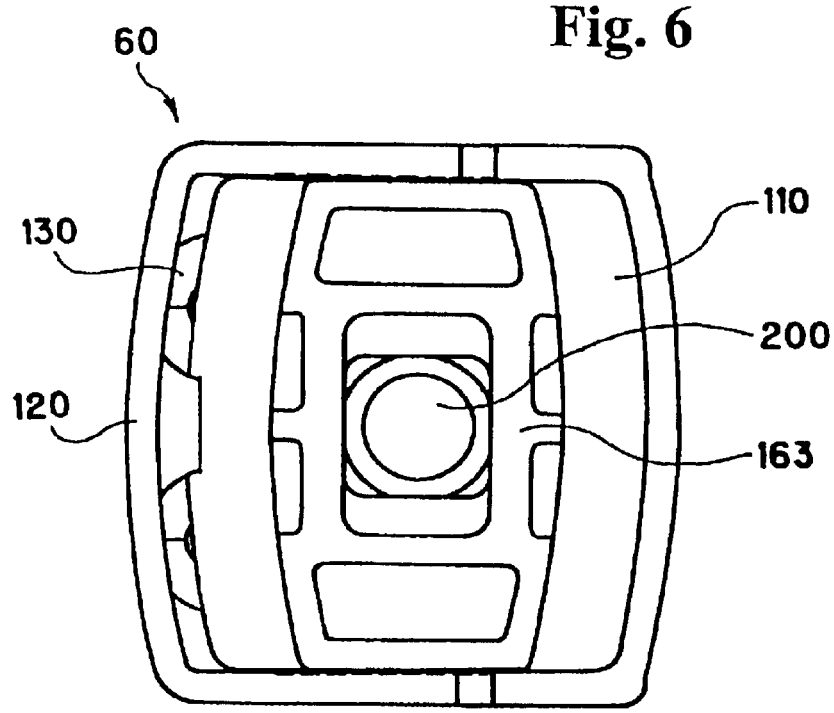
FIG. 6 is a plan view of the guide.
Figure 7:
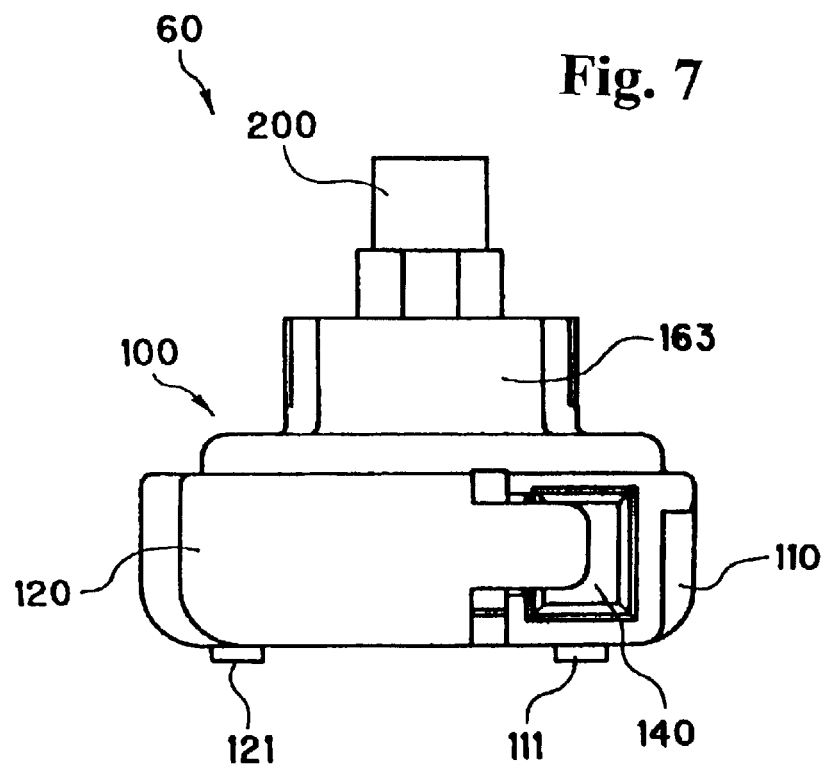
FIG. 7 is a side view of the guide.
Figure 8:
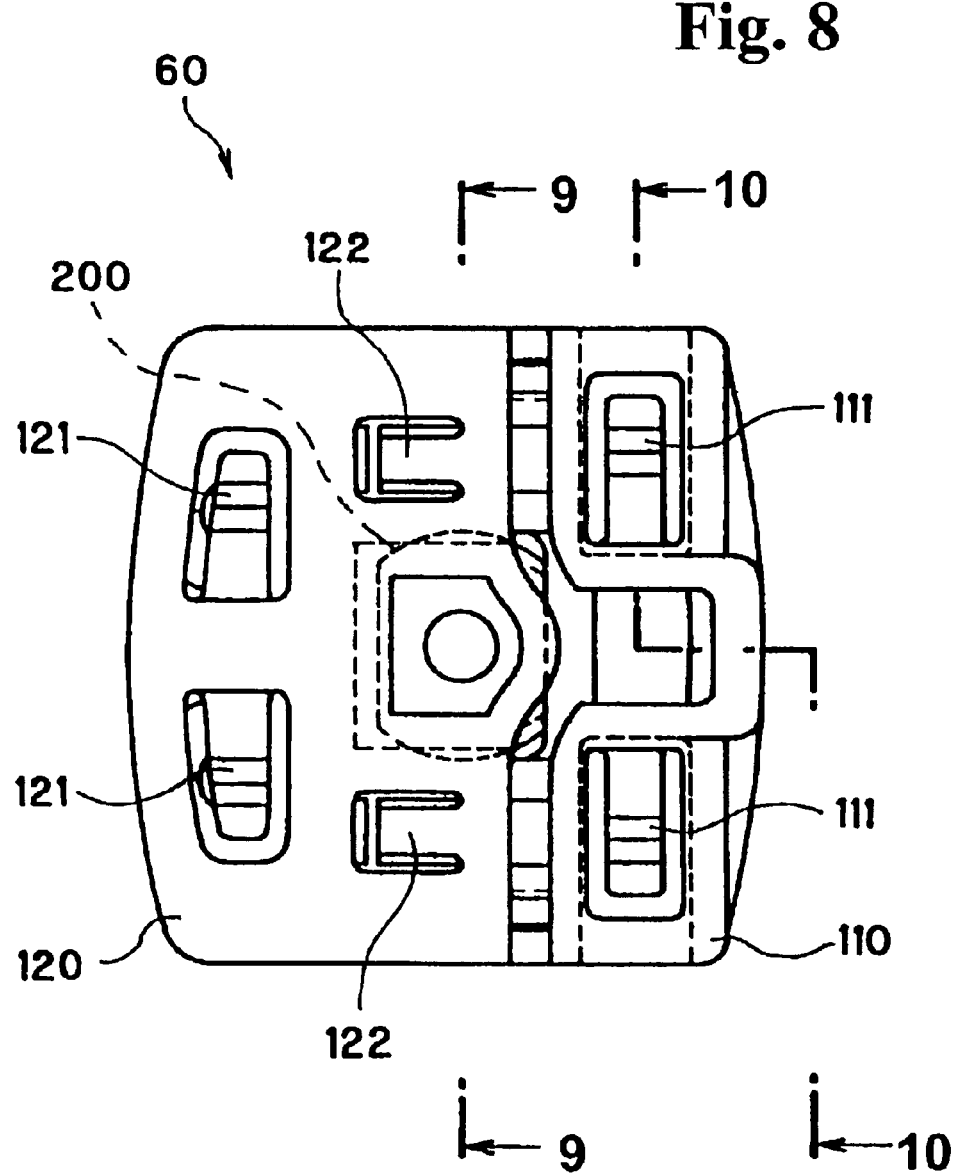
FIG. 8 is a bottom view of the guide.
Figure 9:
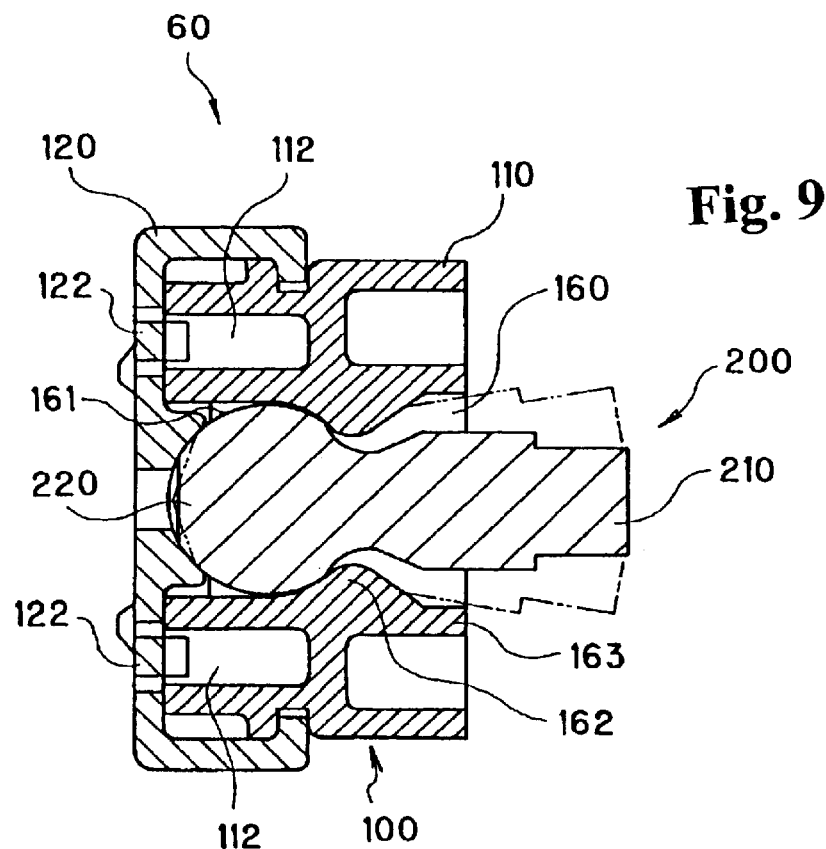
FIG. 9 is a cross sectional view taken along 9—9 line in FIG.
Figure 10:
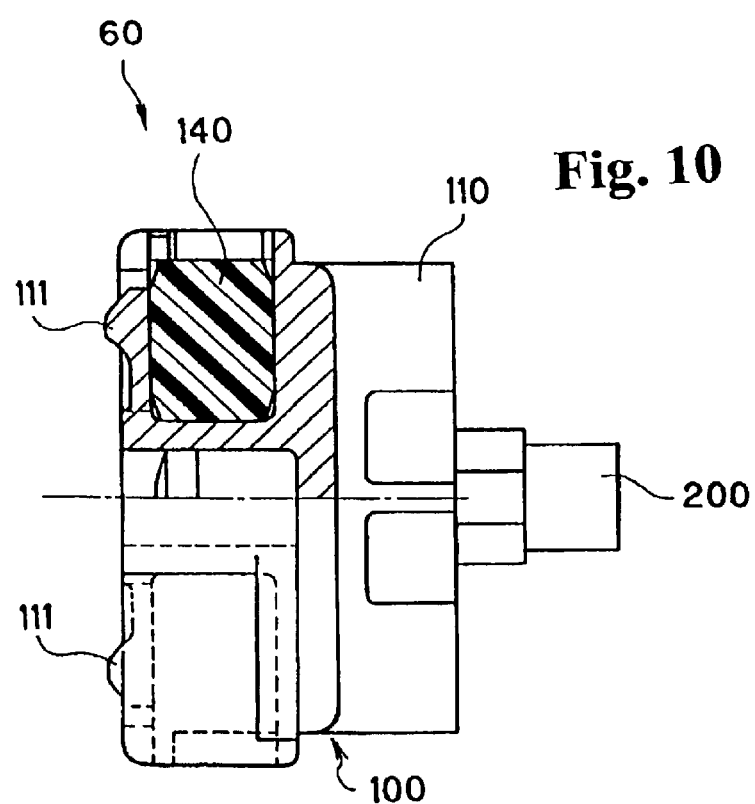
FIG. 10 is a cross sectional view taken along 10—10 line in FIG. 8.
Figure 11:
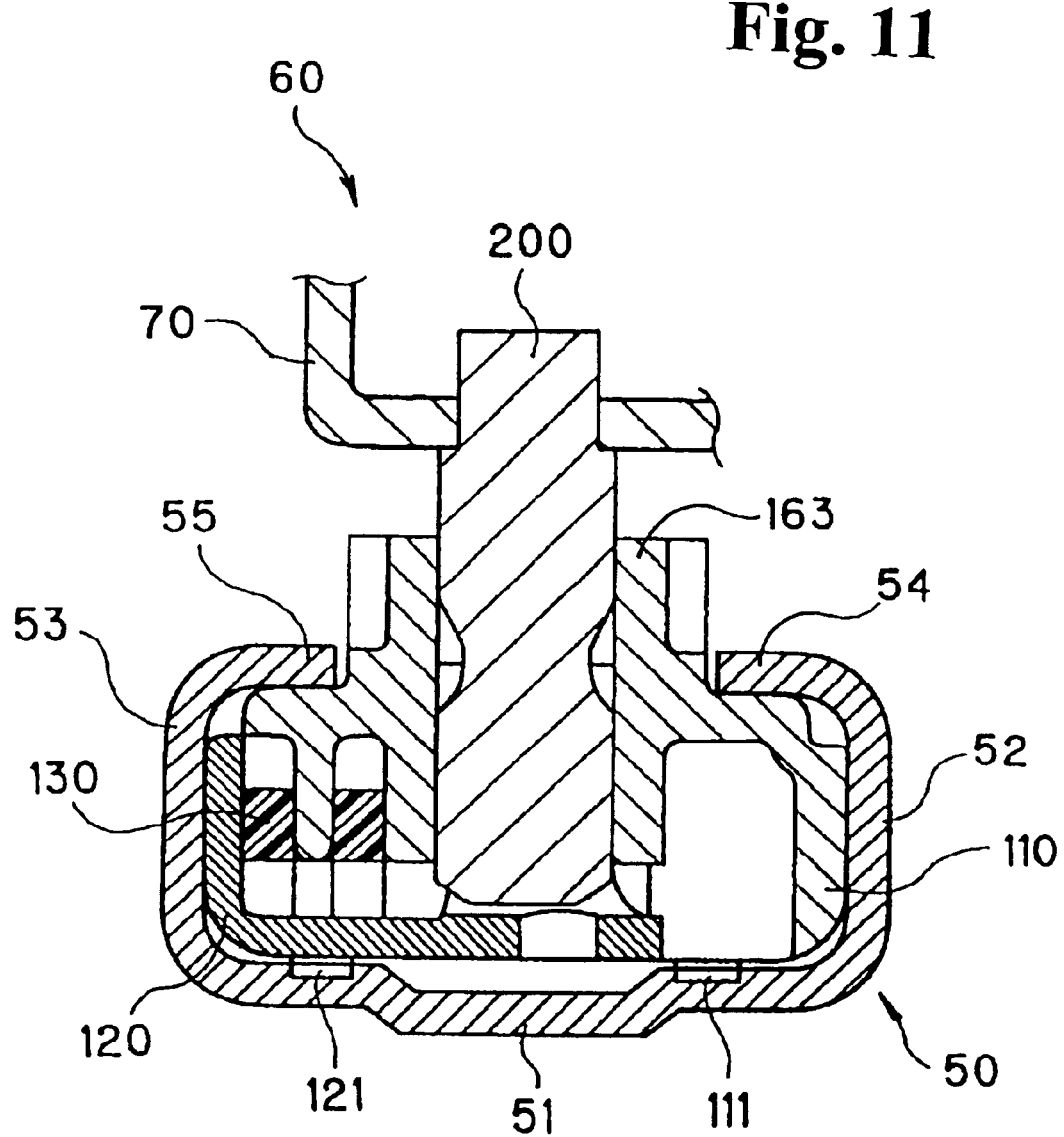
FIG. 11 is an enlarged cross sectional view showing a mounting state of the guide, wherein the guide is cut as shown in FIG. 1 and is viewed from a back side thereof.

FIGS. 1–11 show embodiments of the present invention, respectively. FIG. 1 is a partial cross sectional view showing a device for elevating and lowering a window glass of a vehicle, FIG. 2 is a side view of a door, FIG. 3 is a partial cross sectional view showing a mounting state of the window glass, FIG. 4 is an enlarged cross sectional view of a backside guide rail shown in FIG. 1, FIG. 5 is an exploded perspective view of a guide, FIG. 6 is a plan view of the guide, FIG. 7 is a side view of the guide, FIG. 8 is a bottom view of the guide, FIG. 9 is a cross sectional view taken along 9—9 line in FIG. 8, FIG. 10 is a cross sectional view taken along 10—10 line in FIG. 8, and FIG. 11 is an enlarged cross sectional view showing a mounting state of the guide, wherein the guide is cut as shown in FIG. 1 and is viewed from a back side thereof.

(Elevating-lowering device 10)

In FIGS. 1–2, 10 denotes the guide for elevating and lowering a window glass 20 of the vehicle.

(Elevator Device 10)

In FIGS. 1–2, 10 denotes the guide for raising and lowering a window glass 20 of the vehicle.

The elevator device 10 is disposed, for example, on the door 30, and connected to a window regulator (not shown in the figure). Incidentally, the elevator device 10 is not limited to the door 30. The elevator device 10 mainly includes the following configuration as shown in FIGS. 1–2.

(1) Guide rails 40, 50

(2) Guide 60

(3) Bracket 70

Incidentally, the elevator device 10 is not limited to the above-mentioned structure: (1)–(3). For example, although it is not shown in the figure, a shaft 200 may be directly fixed to the window glass 20 without the bracket 70.

(Window Glass 20)

Within upper and lower limits of the window glass 20, as shown in FIG. 3, the following parts are disposed.

(1) Weatherstrip 80

(2) Stabilizer 90

Incidentally, the parts disposed at the elevator position of the window glass 20 are not limited to the above-mentioned structure: (1)–(2).

(Door 30)

As shown in FIG. 1, the door 30 mainly includes the following parts.

Incidentally, the parts of the door 30 are not limited to the following (1)–(2).

(1) Outer panel 31

The outer panel 31 is located at the outside of the vehicle.

(2) Inner panel 32

The inner panel 32 is located at the inside of the vehicle.

(Guide Rail 40, 50)

As shown in FIG. 2, a pair of the guide rails 40, 50 is disposed at the front and back sides of the door 30.

The guide rail 40 located at the front side of the door 30 has an opening facing the backside of the vehicle, although it is not shown in the figure. The window glass 20 is mounted on the front side guide rail 40 for elevating and lowering through the existing guide, though it is not shown in the figure. The guide rail 50 at the backside of the door 30 has an open portion 56 facing the front side of the vehicle, as described later.

The backside guide rail 50, as shown in FIG. 1, is located between the outer panel 31 and the inner panel 32, and fixed to the inner panel 32 side. Incidentally, the backside guide rail 50 is inclined relative to a moving direction of the vehicle, or is slightly curved. More specifically, the backside guide rail 50 mainly includes the following configuration, as shown in FIG. 4.

Incidentally, the configuration of the backside guide rail 50 is not limited to the following structure: (1)–(4).

(1) Inner back wall 51

(2) Sidewalls 52, 53

A pair of the sidewalls 52, 53, as shown in FIG. 4, is located at the right and left sides, and projects respectively from both right and left ends of the inner back wall 51.

More specifically, as shown in FIG. 1, the right and left sidewalls 52, 53 are formed of the inner sidewall 52 at the inside of the vehicle and the outer sidewall 53 at the outside thereof.

(3) Top wall 54, 55

A pair of the top walls 54, 55, as shown in FIG. 4, is located at the right and left sides, and is curved inwardly and oppositely from the right and left sidewalls 52, 53.

(4) Open portion 56

The open portion 56, as shown in FIG. 4, faces the inner back wall 51, and located between the top walls 54, 55 at the right and left sides.

(Guide 60)

The guide 60 is mounted and slidable in the backside guide rail 50 between the front and back guide rails 40, 50, and is connected to the bracket 70, as shown in FIG. 1.

More specifically, the guide 60, as shown in FIGS. 5, 7, mainly includes the following parts.

(1) Guide main member 100

(2) Shaft 200

Incidentally, the parts of the guide 60 are not limited to the above-mentioned structure: (1)–(2).

(Bracket 70)

The bracket 70, as shown in FIG. 1, fixes the window glass 20 to the shaft 200, and is curved in an L-shape.

(Main Guide Member 100)

The main guide member 100 is mounted and slidable in the backside guide rail 50.

More specifically, the main guide member 100, as shown in FIG. 5, mainly includes the following parts.

(1) Base 110

(2) Slider 120

(3) Elastic members 130 and 140

Incidentally, the parts of the guide main member 100 are not limited to the above-mentioned structure: (1)–(3).

(Shaft 200)

The shaft 200, as shown in FIGS. 1, 5, fixes the window glass 20 projecting from the open portion 56 of the backside guide rail 50.

Additionally, the shaft 200, as shown in FIG. 9, is held by the base 110, and mounted to be rotatable only in a direction that the window glass 20 is elevated. The shaft 200, as shown in FIG. 5, mainly includes the following parts.

(1) Shaft main member 210

(2) Round head portion 220

Incidentally, the shaft 200 is not limited to the above-mentioned parts.

(Base 110)

The base 110, as shown in FIGS. 5, 11, is one side of parts divided in the width direction of the vehicle, and contacts the inner face of the inner sidewall 52.

The base 110, as shown in FIGS. 5–11, mainly includes the following parts. Incidentally, the parts of the base 110 are not limited to the following (1)–(3).

(1) Shaft direct connection 160

The shaft direct connection 160, as shown in FIG. 9, is provided for mounting the shaft 200 to be rotatable only in the elevating direction of the window glass 20.

(2) Projections 111

The pair of projections 111, as shown in FIGS. 5, 11, is located at upper and lower sides, and elastically projects toward the inner surface of the inner back wall 51 of the backside guide rail 50.

(3) Concaves 112

The pair of concaves 112, as shown in FIGS. 5, 9, is located at upper and lower sides, and is elongated along the sliding direction of the slider 120, i.e. a widthwise direction of the vehicle.

(Slider 120)

The slider 120, as shown in FIGS. 5, 11, is the other parts divided in the widthwise direction of the vehicle, and contacts the outer sidewall 53. Also, the slider 120 is held by the base 110 and can slide in the width direction of the vehicle.

The slider 120, as shown in FIGS. 5–11, mainly includes the following parts. Incidentally, the parts of the slider 120 are not limited to the following structure: (1)–(3).

(1) Projections 121

The pair of projections 121, as shown in FIGS. 5, 11, is located at upper and lower sides, and elastically projects toward the inner surface of the inner back wall 51 of the backside guide rail 50.

(2) Claws 122

The claws 122, as shown in FIGS. 5, 9, connect the base 110 and the slider 120 by elastically fitting into the concaves 112. Each claw 122 controls movement of the slider 120 in a direction toward the outside of the vehicle by abutting against the stopper 113 at one end of each concave 112 in a longitudinal direction.

(Elastic Members 130, 140)

The elastic members 130, 140, as shown in FIG. 5, mainly include the following types.

(1) One of first elastic member 130

(2) Two of second elastic members 140

Incidentally, the types of elastic members 130, 140 are not limited to the above-mentioned structure: (1)–(2), and one is enough.

(Shaft Connection 160)

The shaft connection 160, as shown in FIG. 9, mainly includes the following parts.

Incidentally, the parts of the shaft connection 160 are not limited to the following structure: (1)–(3).

(1) Bearing 161

The bearing 161, as shown in FIG. 9, supports the ball head portion 220 to be rotatable in the elevating direction of the window glass 20.

(2) Bulge 162

The bulge 162, as shown in FIG. 9, projects inwardly with a circular shape toward the bearing 161, and prevents the ball head portion 220 from disengaging out of the bearing 161.

(3) Guide frame 163

The guide frame 163, as shown in FIGS. 6, 9, surrounds a moving range of the main shaft member 210 in a quadrangular shape, and is elongated along the sliding direction of the slider 120, i.e. the vertical direction. The main shaft member 210, as shown in FIG. 9, is controlled in the range of the vertical movement by abutting against the upper and lower walls of the guide frame 163.

The right-and-left movement of the main shaft member 210, as shown in FIG. 6, is also controlled by abutting against the right and left walls of the guide frame 163.

(First Elastic Member 130)

The first elastic member 130, as shown in FIG. 11, is located between the base 110 and the slider 120, and presses the slider 120 toward the outside direction of the vehicle.

Also, the first elastic member 130, as shown in FIG. 5, is located across the two projections 121 of the slider 120, and although it is not shown in the figure, the first elastic member 130 urges each projection 121 in the projecting direction toward the inner surface of the inner back wall 51 of the backside guide rail 50.

(Second Elastic Members 140)

There are two second elastic members 140, as shown in FIGS. 5 and 10. Each of the second elastic members 140 is located inside the two projections 111 of the base 110, respectively, and urges each of the projections 111 in the projecting direction toward the inner surface of the inner back wall 51 of the backside guide rail 50.

(Operation of the Guide 60)

The guide 60 with the above-mentioned configuration operates as follows.

First, at the highest elevating position of the window glass 20, as shown in FIG. 3, a reaction force F2 is exerted on the shaft 200 of the guide 60 through the bracket 70 with the stabilizer 90 as a rotational center by a reaction force (F1) of the weatherstrip 80. At this time, since the shaft 200 is directly connected to the base 110, the base 110 directly contacts the inner surface of the inner sidewall 52 of the backside guide rail 50, so that the main guide member 100 of the guide 60 is prevented from moving inside the backside guide rail 50.

On the other hand, when the reaction force (F1) of the weatherstrip 80 is not exerted upon, for example, opening the door 30, the reaction force F3 in the opposite direction of the F2 is exerted by the window glass 20 own weight, and the base 110 moves closer toward the slider 120. At this time, the slider 120 is stuck to the inner surface of the outer vehicle sidewall 53 of the backside guide rail 50. Accordingly, the first elastic member 130 is compressed between the base 110 and the slider 120, and a resilient restoration force of the first elastic member 130 absorbs rattles by a play of the main guide member 100 of the guide 60 inside the backside guide rail 50.

On the other hand, when a force is exerted in the axial direction of the shaft 200 by a vibration or an inertia of the vehicle, the projections 111 of the base 110 and the projections 121 of the slider 120 are pressed toward the inner surface of the inner back wall 51 of the backside guide rail 50. At this time, the resilient restoration forces of the projections 111, 121 absorb the rattles of the main guide member 100 of the guide 60 inside the backside guide rail 50.

Also, the second elastic members 140 are pressed by the projections 111 of the base 110, and the resilient restoration forces of the second elastic members 140 are exerted as well. Similarly, the first elastic member 130 is pressed by the projections 121 of the slider 120, and the resilient restoration force of the first elastic member 130 is also exerted.

The present invention with the above-mentioned configurations has the following effects. According to the first aspect of the invention, the following effect is obtained.

In the first aspect, the present invention can provide the guide suitable for the guide rail with the opening facing at least the front or back of the vehicle. That is, the guide is divided in the widthwise direction of the vehicle and the shaft is directly connected to the base side. Therefore, when the force is exerted on the base side, it is possible to prevent the rattles. On the other hand, when the force is exerted on the slider side through the shaft, the rattles can be absorbed with the elastic member disposed between the base and the slider. According to the second aspect, in addition to the effect of the first aspect of the invention described above, an effect can be obtained as follows.

That is, according to the second aspect of the invention, it is possible to provide the guide in which the projections of the guide elastically abut against the bottom of the guide rail, thereby absorbing the rattles in a vertical direction of the guide rail. According to the third aspect, in addition to the effect of the second aspect of the invention described above, further effect can be obtained as follows.

That is, according to the third aspect of the invention, it is possible to provide the guide having the elastic member for supporting the elastic force of the projections. According to the fourth aspect, in addition to any one of the effects of the first to third aspects of the invention described above, the other effect can be obtained as follows.

That is, according to the fourth aspect of the invention, it is possible to provide the guide wherein the concave engages the claw, thereby simplifying the assembly of the guide, and also it is possible to control the sliding amount of the slider relative to the base. According to the fifth aspect, in addition to any one of the effects of the first to fourth aspects of the invention described above, further effect can be obtained as follows.

That is, according to the fifth aspect of the invention, it is possible to provide the guide suitable for the guide rail with the opening facing the front of the vehicle. According to the sixth aspect, in addition to any one of the effects of the first to fifth aspects of the invention described above, further effect can be obtained as follows.

That is, according to the sixth aspect of the invention, it is possible to provide the guide wherein the shaft is rotated in the elevating direction of the window glass to smoothly elevate the window glass. For example, even when the guide rail is slightly curved relative to the moving direction of the vehicle, the shaft is rotated in the elevating direction of the window glass, thereby absorbing the curve of the guide rail.

Incidentally, the rotation of the shaft in the widthwise direction of the vehicle is limited so as not to hinder the function of the guide for preventing and absorbing the rattles of the window glass.

While the present invention has been explained with reference to the specific embodiments of the invention, the explanation is illustrative and the invention is limited only by the appended claims. Various changes and modifications may be made without departing from the scope of the present invention.

What is claimed is:

1. A guide system for guiding a window glass of a vehicle, comprising:

a guide rail having a back wall, a pair of side walls extending from the back wall, and an opening between the side walls, said guide rail being arranged such that the opening faces a length direction of the vehicle; and a guide slidably disposed in the guide rail and comprising:

a shaft to be attached to the window glass, a base slidably inserted in the guide rail to contact only one of the side walls and holding the shaft, a slider attached to the base member and slidably inserted in the guide rail to contact only the other of the side walls, and an elastic member disposed between the base and the slider for pushing the slider to the other of the side walls.

2. A guide system for guiding a window glass according to claim 1, wherein said base is situated in the guide rail at an inner side of the vehicle, and said slider is situated in the guide rail at an outer side of the vehicle.

3. A guide system for guiding a window glass according to claim 2, wherein said elastic member pushes the slider toward the outer side of the vehicle.

4. A guide system for guiding a window glass according to claim 1, wherein at least one of said base and said slider includes a projection projecting toward the back wall of the guide rail.

5. A guide system for guiding a window glass according to claim 4, wherein said elastic member pushes the projection toward the back wall of the guide rail.

6. A guide system for guiding a window glass according to claim 1, wherein one of said base and said slider includes a depression and a stopper, and the other of said base and said slider includes a claw to be disposed in the depression to connect the base to the slider, said stopper restricting the slider when the claw abuts against the stopper.

7. A guide system for guiding a window glass according to claim 1, wherein said opening of said guide rail faces a front of the vehicle.

8. A guide system for guiding a window glass according to claim 1, wherein said shaft is pivotally attached to the base to tilt only in a direction that the window glass moves.

9. A guide system for guiding a window glass according to claim 1, wherein said base includes a shaft connection for receiving the shaft therein to substantially entirely support a force applied to a lateral side of the shaft.

10. A guide system for guiding a window glass according to claim 9, wherein said slider includes a portion disposed at a back side of the shaft connection of the base for holding an end side of the shaft.

11. A guide system for guiding a window glass according to claim 10, wherein said base, said elastic member, said slider, and said side walls are all arranged side by side.

* * * * *